US009162791B2

(12) United States Patent
Gartrell, III

(10) Patent No.: US 9,162,791 B2
(45) Date of Patent: Oct. 20, 2015

(54) SAFETY BRAKE DEVICE FOR THEATRE HOIST

(71) Applicant: The Rowland Company, Philadelphia, PA (US)

(72) Inventor: Robert Z. Gartrell, III, Mt. Pleasant, SC (US)

(73) Assignee: The Rowland Company, Philadelphia, PA (US)

( * ) Notice: Subject to any disclaimer, the term of this patent is extended or adjusted under 35 U.S.C. 154(b) by 88 days.

(21) Appl. No.: 13/845,696

(22) Filed: Mar. 18, 2013

(65) Prior Publication Data

US 2013/0214225 A1 Aug. 22, 2013

Related U.S. Application Data

(62) Division of application No. 12/567,338, filed on Sep. 25, 2009, now Pat. No. 8,448,922.

(51) Int. Cl.

| | |
|---|---|
| ***F16D 55/02*** | (2006.01) |
| ***B65D 5/00*** | (2006.01) |
| ***A63J 1/02*** | (2006.01) |
| ***B66D 5/14*** | (2006.01) |

(52) U.S. Cl.

CPC . *B65D 5/00* (2013.01); *A63J 1/028* (2013.01); *B66D 5/14* (2013.01)

(58) Field of Classification Search

CPC .............. B66D 5/00; B66D 5/14; A63J 1/028

USPC ............... 188/71.2, 71.1, 72.1, 73.1, 218 XL, 188/251 A; 192/12 R, 13 R, 16; 254/278, 254/318, 319, 321, 356, 375

See application file for complete search history.

(56) References Cited

U.S. PATENT DOCUMENTS

| | | | | |
|---|---|---|---|---|
| 3,797,325 | A | 3/1974 | Christison | |
| 3,901,478 | A | 8/1975 | Peterson | |
| 4,175,727 | A * | 11/1979 | Clarke | 254/274 |
| 4,226,311 | A * | 10/1980 | Johnson et al. | 192/223 |
| 4,518,153 | A * | 5/1985 | West et al. | 254/274 |
| 4,615,418 | A | 10/1986 | Atwell | |
| 4,854,547 | A | 8/1989 | Oliphant | |
| 4,943,921 | A | 7/1990 | Baltusis et al. | |
| 5,141,085 | A | 8/1992 | McCormick | |
| 5,899,441 | A | 5/1999 | Kuivamaki et al. | |
| 6,630,416 | B1 * | 10/2003 | Lam et al. | 442/417 |
| 6,830,531 | B1 | 12/2004 | Koenig et al. | |
| 6,889,958 | B2 | 5/2005 | Hoffend, Jr. | |
| 8,448,922 | B2 * | 5/2013 | Gartrell, III | 254/321 |
| 8,613,428 | B2 * | 12/2013 | Hoffend, III | 254/374 |
| 2004/0168865 | A1 | 9/2004 | Kuivamaki et al. | |

FOREIGN PATENT DOCUMENTS

| | | | |
|---|---|---|---|
| JP | 09229113 | A * | 9/1997 |
| KR | 101180271 | B1 * | 9/2012 |

* cited by examiner

*Primary Examiner* — Pamela Rodriguez
(74) *Attorney, Agent, or Firm* — Paul & Paul

(57) ABSTRACT

A safety brake device for a theatre hoist to prevent the uncontrolled release of a load that is suspended above or below people includes an overrunning clutch and a torque disc. The torque disc only rotates with the overrunning clutch when the load is lowered, but must overcome friction forces applied to the surface of the torque disc to do so. The friction forces are constantly applied to the torque disc by maintaining friction material in contact with the torque disc. The friction material is a non-asbestos, non-metallic composite saturated with a lubricant.

7 Claims, 7 Drawing Sheets

SAFETY BRAKE DEVICE FOR THEATRE HOIST

CROSS-REFERENCE TO RELATED APPLICATIONS

This application is a division of U.S. application Ser. No. 12/567,338, filed Sep. 25, 2009, now U.S. Pat. No. 8,448,922 B2, issued on May 28, 2013.

BACKGROUND OF THE INVENTION

1. Field of Invention

The present invention relates to safety brakes and, more specifically, to a safety brake device applied to theatre hoists that lift and maintain heavy loads suspended.

2. Description of Prior Art

Hoists that lift loads in a vertical direction are used in many industries for a variety of applications. For theatrical settings, athletic and entertainment arenas, overhead lifting with higher safety standards are routinely required because hoists are lifting loads directly over human beings. It is also common for portions of the staging in these theatrical settings to be lifted. Similar safety standards are required in these instances because people may be standing on the portion of the stage being lifted.

Live performances in a theater typically employ a number of curtains and backdrops to convey to the audience different settings, environments, moods, and the like. These curtains and backdrops must be changed throughout the course of a performance within a fairly short time frame without interrupting the performance. Typically this is done by raising a particular backdrop above the stage and out of sight of the audience when it is not being used. When a particular backdrop is needed, it is lowered into place on the stage.

Theatrical backdrops and curtains are typically suspended from battens, which are pipes or trusses that span the width of the stage. Battens can be 20 feet or more in length, depending on the size of the stage. As should be apparent, the weight of the battens and the items suspended from them can have substantial weight. As the weight of the load increases so does the power required to raise the load. Counterweights are employed to balance the load of the batten and its associated load. However, if the load is not closely balanced or if there is a failure in the motorized drive lifting the hoist, the system may get out of control, dropping the load or the counterweight, causing injury or death to people nearby and/or collateral damage.

Therefore, because of the risk of hoist failure, there is a need for a safety device to prevent the uncontrolled release of heavy loads and staging that are either supported above or below human beings.

SUMMARY

The present invention comprises a combination overrunning clutch, torque disc, and friction material for preventing the uncontrolled lowering of a load. An axle connected to a motorized drive engages the overrunning running clutch. A torque disc fixedly attached to the overrunning clutch will rotate with the overrunning clutch when a load is lowered; however, resistance against rotation is generated by a set of fixed friction discs applying pressure to the sides of the torque disc. In order to lower a load, the motorized drive must overcome the friction forces applied to the side surfaces of the torque disc, thus enabling the axle to rotate.

None of the prior art devices are seen to offer the advantages of the present invention that will become apparent from the detailed description of the invention provided below.

It is an advantage of the present invention to provide a safety brake device that prevents the uncontrolled release of a suspended load.

It is a further advantage of the present invention to provide a safety brake device that provides smooth consistent resistance without producing excessive noise during operation.

It is a further advantage of the present invention to provide a safety brake device that uses a friction material that operates consistently at different temperatures and irregular use.

It is a further advantage of the present invention to provide a safety brake device that uses a friction material that is long wearing, thereby reducing the need for adjustment.

It is an advantage of the present invention to provide device of simple design and manufacture that can be fitted to current hoisting systems.

Other objects and advantages of the present invention will in part be obvious, and in part appear hereinafter.

BRIEF DESCRIPTION OF THE DRAWINGS

The present invention will be more fully understood and appreciated by reading the following Detailed Description in conjunction with the accompanying drawings, in which.

DETAILED DESCRIPTION

Figure 1:
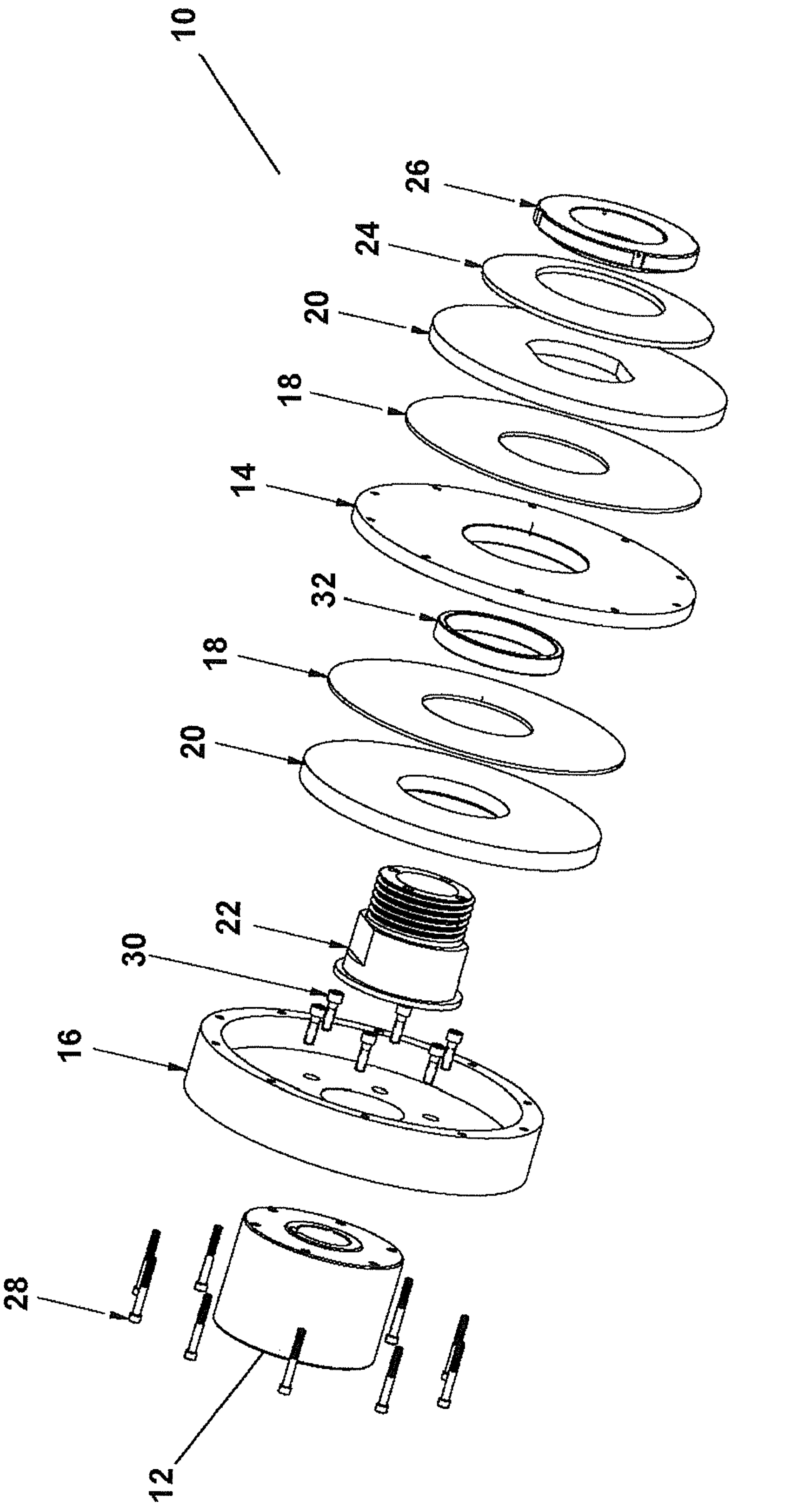
FIG. 1 is an exploded perspective view of a first embodiment of the present invention.
Figure 4:
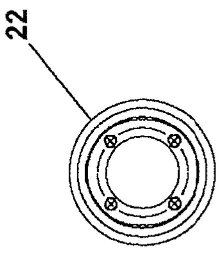
FIG. 4 is a right-side elevational view of a hub for the first embodiment of the present invention.
Figure 3:
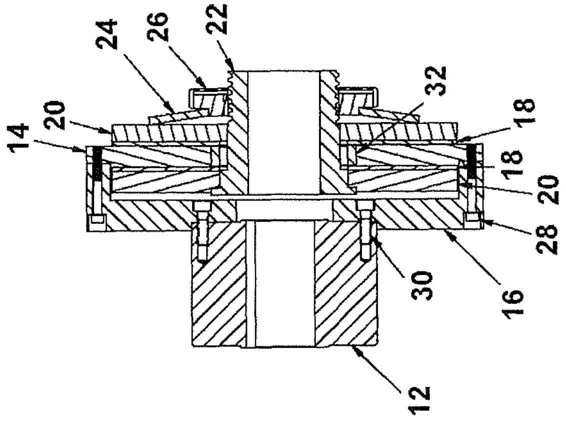
FIG. 3 is a cross-sectional view of the first embodiment along line "A-A" of FIG. 2.
Figure 2:
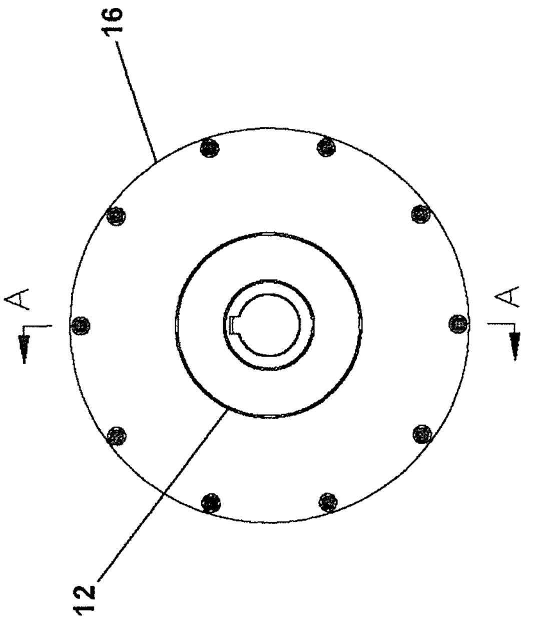
FIG. 2 is left-side elevational view of the first embodiment of FIG. 1.

A first embodiment of the present invention is shown in FIGS. 1 through 4. The first embodiment of the safety brake device comprises an overrunning clutch 12 and a disc assembly 10. The overrunning clutch 12 may be of any suitable design known in the art, such as a ramp and roller or sprag, and includes a keyed bore enabling the inner race of the overrunning clutch to rotate with an axle installed through the keyed bore. The clutch is designed and installed such that the outer race will rotate with the inner race and axle only when a load is lowered.

The disc assembly 10 comprises a hub 22 which is installed adjacent to the overrunning clutch 12 along the axle. The hub 22 also has a bore enabling it to be installed onto the axle; however, the diameter of the bore is not keyed and is larger than the diameter of the axle, so that the hub 22, if fixed, will not rotate with the axle. Mounted onto the hub is a torque disc 14 sandwiched between a set of friction discs 18 and backing plates 20. A securing means is required to constantly maintain a force that presses the friction discs 18 against the sides of the torque disc 14. In the first embodiment, the securing means comprises a nut 26 and Belleville washer 24 that is screwed onto a threaded end of the hub 22, such that the Belleville washer is pressed against one face of a backing plate 20. The disc assembly 10 further comprises an adaptor 16 fixed to the torque disc 14. A first set of screws 28 are used to attach the torque disc 14 to the adaptor 16.

A second set of screws 30 are used to attach the adaptor 16 to the outer race of the overrunning clutch 12. The adaptor 16 and torque disc 14 are fixedly attached to the outer race of the overrunning clutch 12, so that the three elements will rotate together when lowering a load; however, the friction discs 18 and backing plates 20 remain fixed on the hub 22 and will not rotate with the torque disc 14, thus generating a friction forces between the torque disc 14 and friction discs 18 when a load is lowered. The disc assembly optionally includes a bearing 32 that keeps the torque disc 14 aligned with the friction discs 18 and prevent uneven wear of the friction discs.

Figure 5A:
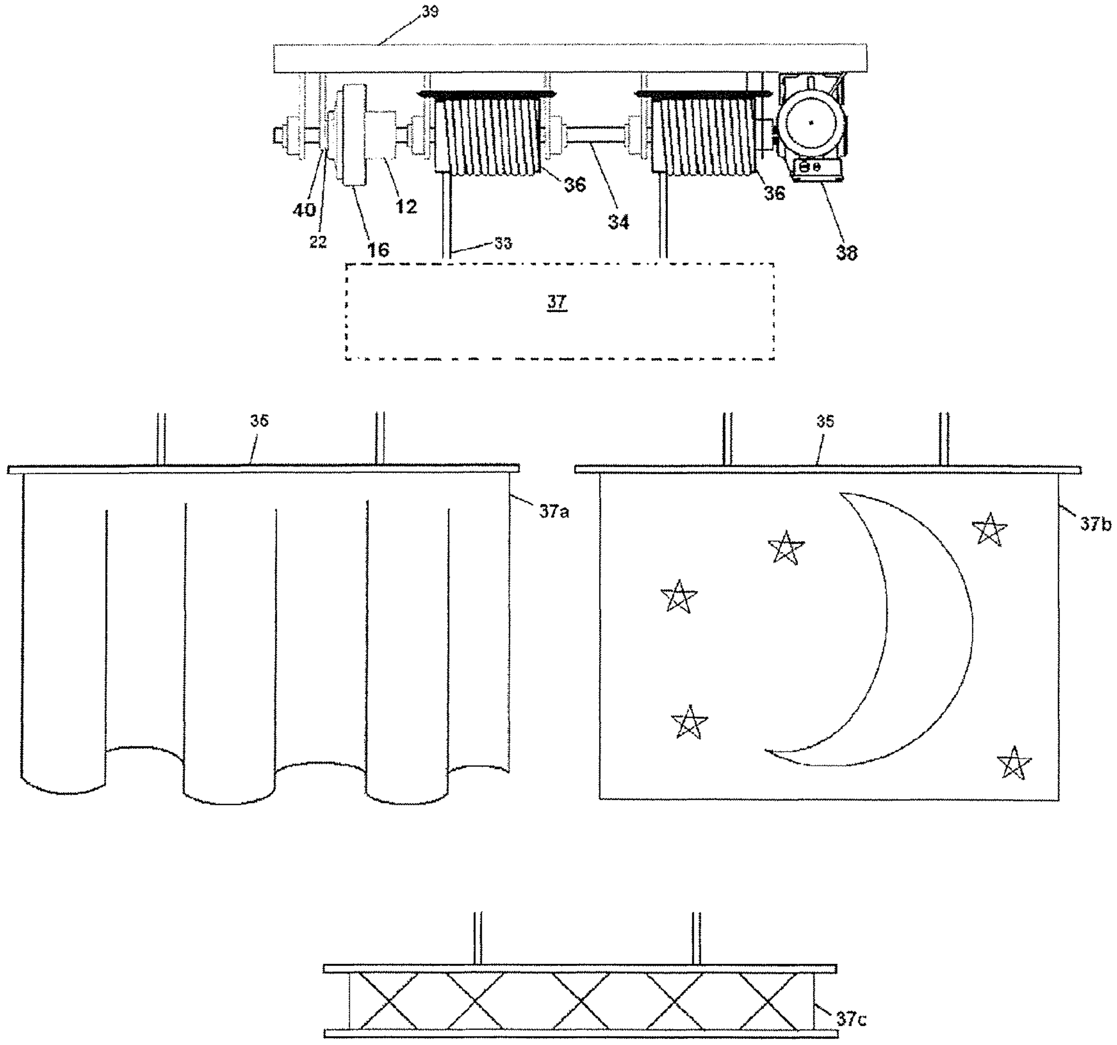
FIG. 5*a* is an elevational view of a first embodiment of the present invention mounted on an axle and suspended from a frame.
Figure 5B:
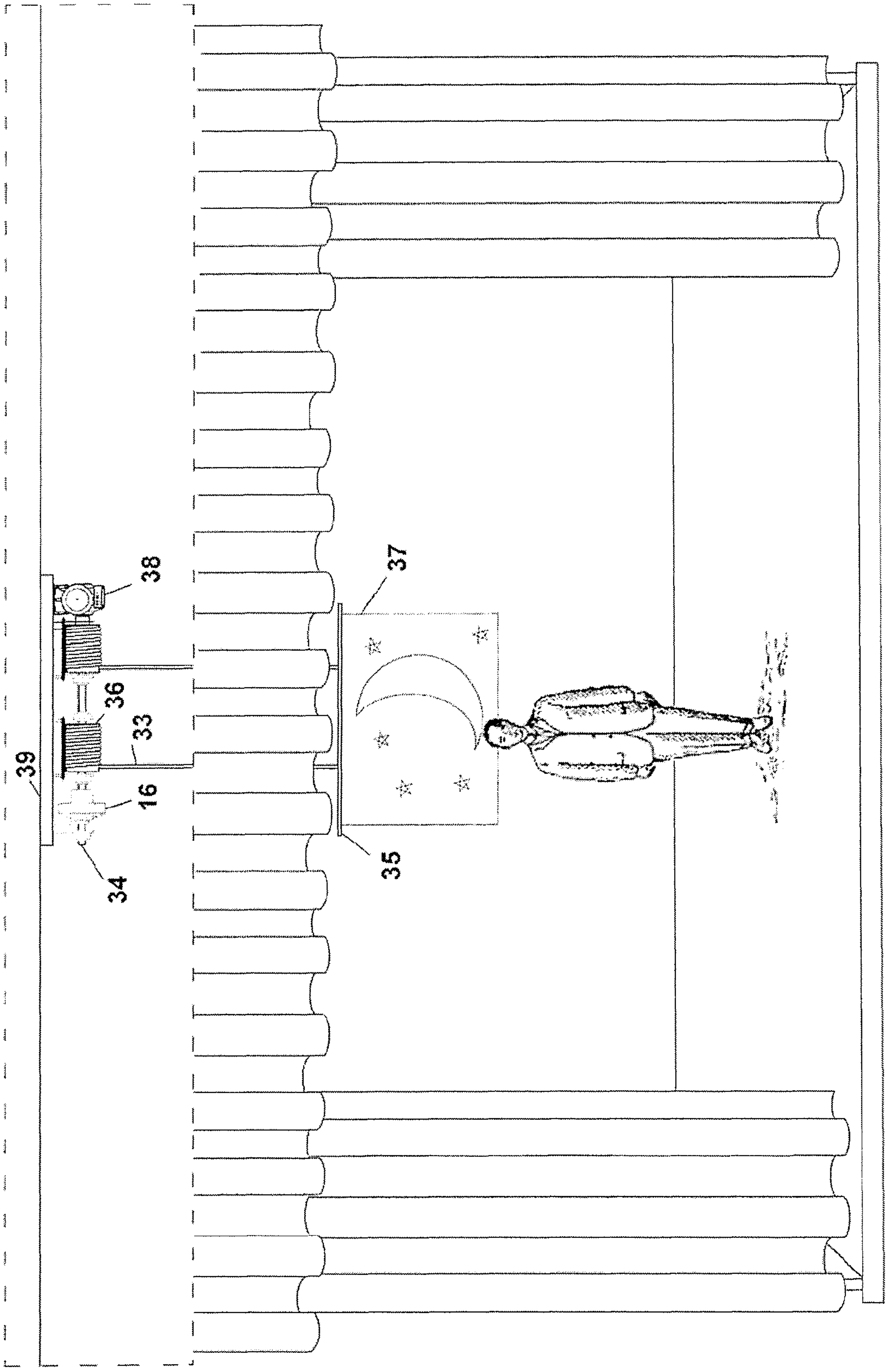
FIG. 5*b* is an elevational view of an installed first embodiment of the present invention above a stage.
Figure 7:
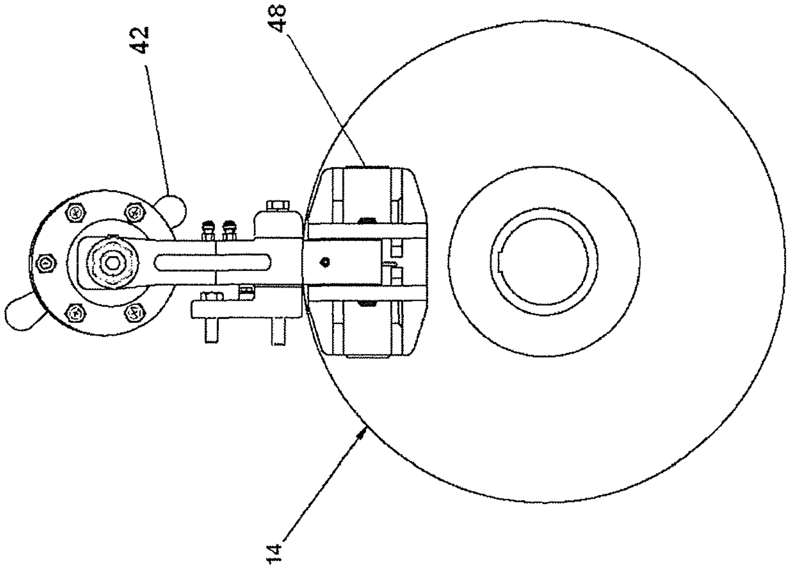
FIG. 7 is a left-side elevational view of the second embodiment of FIG. 6.

Referring now to FIGS. 5*a* and 5*b*, a typical environment in which the present invention may be installed is shown. The safety brake device is mounted on the opposite end of an axle 34 from a motorized drive 38 and suspended from a frame 39 above a stage. The dashed outline in FIG. 5*b* provides a cut-away view of the area above the stage where the first embodiment of the invention is typically installed. The exposed face of the hub 22 is attached to a bracket 40 which keeps the hub 22 fixed as the axle 34 rotates. A set of winch drums 36 fixed onto the axle 34 may also be present. Cables 33 wound around the winch drums 36 are attached to a batten 35 from which a load 37, such as a curtain 37*a* or theatrical scenery 37*b*, is suspended. The cables 33 can also be directly attached to a load, such as a platform 37*c*. When the motorized drive 38 rotates the axle 34 to lift a load, the inner race of the overrunning clutch 12 rotates with the axle 34, but the remaining parts of the safety brake device remain fixed.

Once a load is suspended, the motorized drive 38 stops. The weight of the load will force the axle 34 to rotate in the opposite direction to lower the load; however, at this instance, the overrunning clutch 12 will lock, so that the outer race, adaptor 16, and torque disc 14 will attempt to rotate, but will be held in place because of the friction forces between the torque disc 14 and the friction discs 18 which remain stationary with the hub 22. If a friction disc is selected such that the friction forces are equal to the gravitational forces of the load, the motorized drive is not taxed and only a slight application of rotational force to the axle is necessary to set the load in motion.

An appropriate friction material must be selected for the friction discs 18 which has a low differential between static and dynamic coefficients of friction, such that a motorized drive is not heavily taxed when started and loads may be raised and lowered at a slow speed. It is preferred that the ratio between the static coefficient of friction and the dynamic coefficient of friction for the friction material be equal to or greater than 1.05 and less than or equal to 1.15. The friction material needs to provide smooth consistent resistance without producing any squeal, as excessive noise would be unwanted during a performance. Eliminating squeal can be achieved by saturating the friction material with a lubricant. Given the often unpredictable system usage, the friction material needs to be consistent at different temperatures and irregular use. Finally, the material needs to be long wearing reducing the need for adjustment and replacement. Any frictional material known in the art to include these characteristics, for example the frictional materials disclosed in U.S. Pat. No. 6,630,416, the disclosure of which is incorporated herein by reference, is acceptable.

Figure 6:
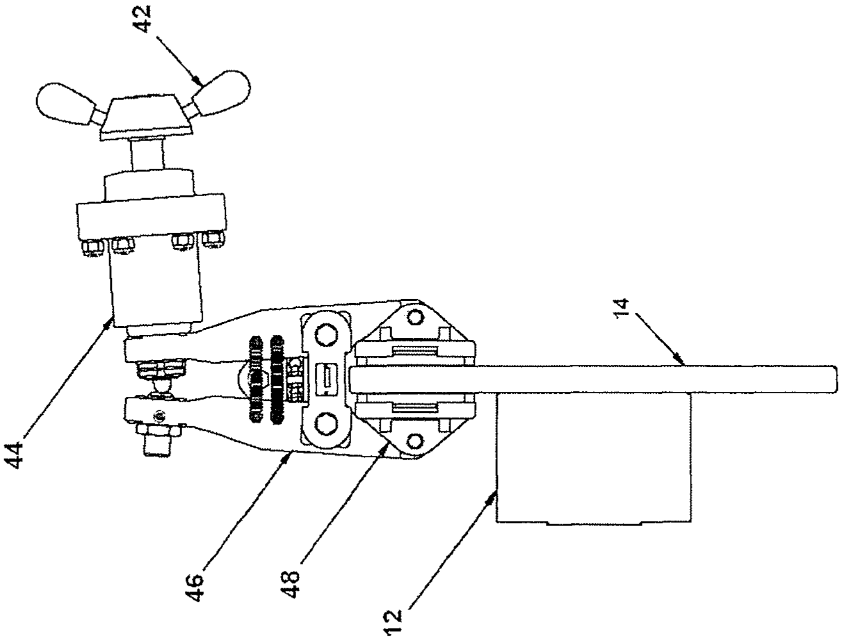
FIG. 6 is a front elevational view of a second embodiment of the present invention.
Figure 9:
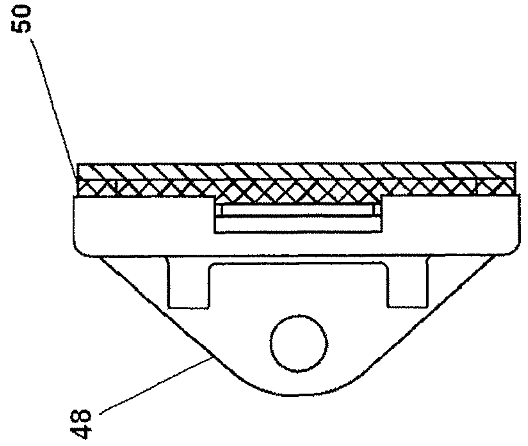
FIG. 9 is a left-side elevational view of the friction disc of FIG. 8.
Figure 8:
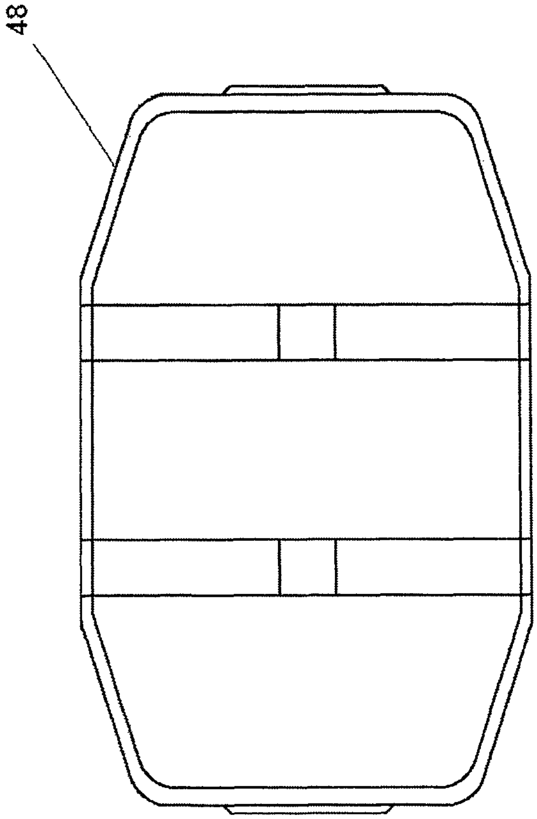
FIG. 8 is a rear elevational view of a friction disc of the second embodiment of the present invention.
Figure 10:
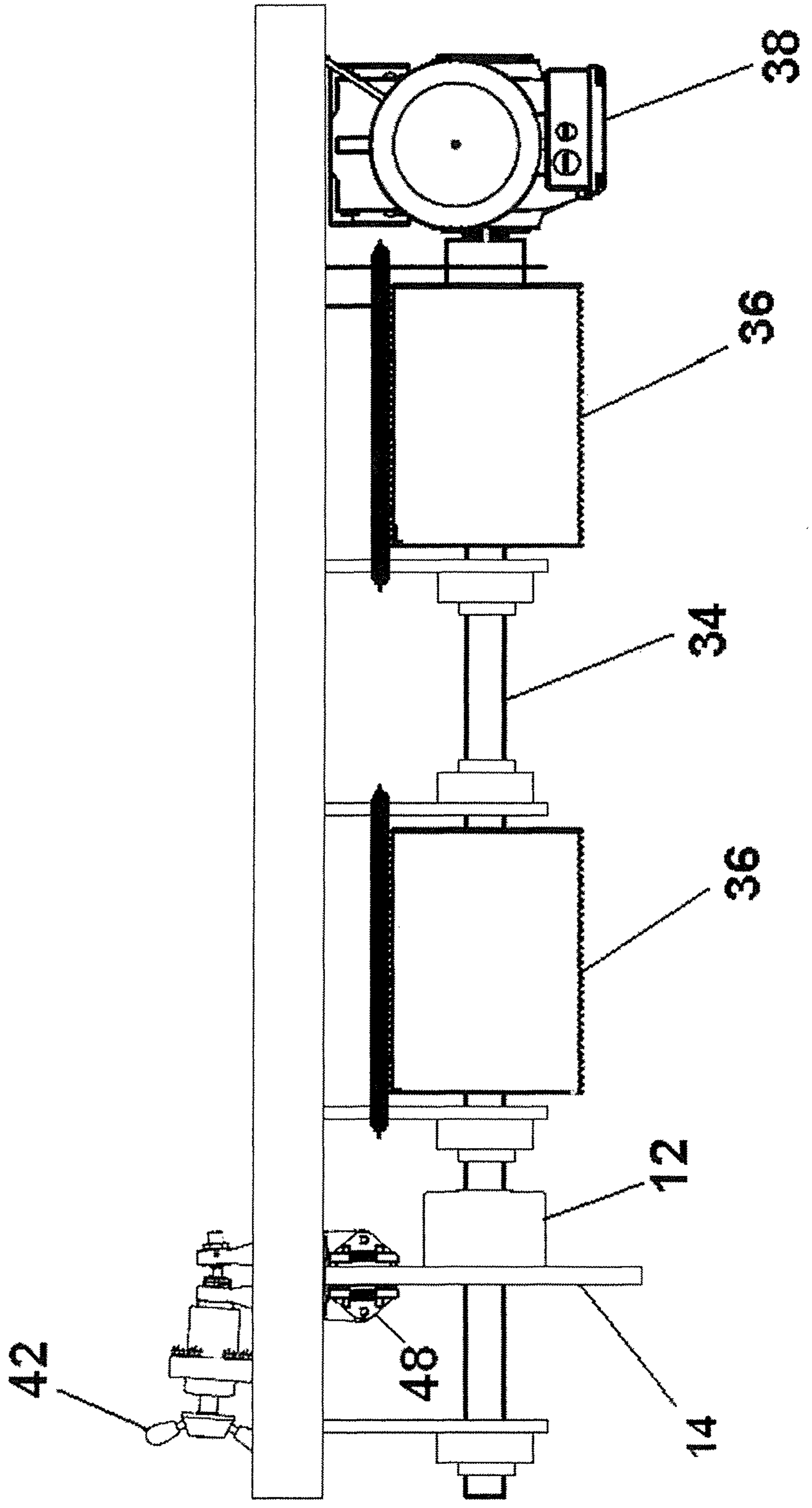
FIG. 10 is an elevational view of an installed second embodiment of the present invention.

Referring now to FIGS. 6 though 9, a second embodiment of the invention is disclosed wherein the disc assembly has been replaced with a caliper and pad assembly. The second embodiment of the invention does not require the use of an adaptor as the torque disc 14 is secured directly to the overrunning clutch 12. The friction material is now in the form of a pair of friction pads that sandwich the torque disc 14. The friction pads are comprised of a shoe 48 to which the friction material 50 is bonded. An intermediate backing layer may be employed between the shoe 48 and the friction material 50. The friction pad shoes 48 are attached to a caliper 44 which applies the necessary force to the sides of the torque disc 14. Turning the knob 42 of the caliper 44 increases the distance between the ends of the caliper arms 46. Because the caliper arms 46 are pivotally connected, the distance is decreased between the opposite ends of the caliper arms 46 to which the friction pads are attached. The knob 42 is turned and left in position to constantly maintain a force on the sides of the torque disc 14. FIG. 10 demonstrates second embodiment of the invention installed in the same typical environment shown in FIG. 5. The caliper 44 is braced to the frame to which the motorized drive and axle are suspended. The torque disc 14 has a bore enabling it to be installed onto the axle; however, the diameter of the bore is not keyed and is larger than the diameter of the axle, so that the torque disc 14 will only rotate with the outer race of the overrunning clutch 12 when a load is lowered. The friction forces applied by the friction pads on the caliper 44 should be equal to the gravitational forces of the load, such that the motorized drive is not taxed and only a slight application of rotational force to the axle is necessary to set the load in motion.

Thus, there has been described and illustrated herein a safety brake device that prevents the uncontrolled release of a suspended load. However, those skilled in the art will recognize that many modifications and variations besides those mentioned specifically may be made in the technique described herein without departing substantially from the spirit and scope of the present invention. For example, the safety brake device may be designed as a drum brake wherein the friction material is in the shape of a collar that applies frictional forces to the circumference of the torque disc. Accordingly, it should be clearly understood that the forms of the invention described herein are exemplary only, and are not intended as a limitation on the scope of the present invention.

What is claimed is:

1. A safety brake device capable of being mounted on to a shaft of a theatre hoist to prevent the uncontrolled release of a suspended load, said safety brake device comprising:

an overrunning clutch having an inner race, an outer race, and said inner race having a first bore along a center-axis of said overrunning clutch to receive the shaft, said first bore of said inner race being a keyed bore that is dimensioned and configured for keyed attachment to said shaft such that said inner race rotates with the shaft when said inner race is keyed to the shaft;

a torque disc fixedly attached to said outer race of said overrunning clutch, said torque disc having a first surface perpendicular to said center-axis, a second surface parallel to said first surface, and a second bore aligned with said center-axis, wherein the shaft has a diameter, wherein said second bore of said torque disc has a diameter greater than the diameter of the shaft to allow the shaft to extend through said second bore of said torque disc while said torque disc can rotate relative to the shaft when said inner race is keyed to the shaft, and wherein the shaft extends through said second bore of said torque disc when said inner race is keyed to the shaft; and a caliper assembly, wherein said caliper assembly comprises a first and second friction pad, wherein said caliper presses said first friction pad against said first surface of said torque disc and said second friction pad against said second surface of said torque disc.

2. The safety brake device of claim 1, wherein said caliper assembly further comprises a first and second caliper arm and said first and second friction pads are bonded to a first and second shoe, respectively, wherein said first shoe is attached to an end of said first caliper arm and said second shoe is attached to an end of said second caliper arm.

3. The safety brake device of claim 1, wherein said overrunning clutch is one of a ramp and roller overrunning clutch or a sprag overrunning clutch.

4. The safety brake device of claim 1, wherein the first and second friction pads are made of a material that is capable of generating static friction greater than or equal to the weight of the load suspended by the hoist employing the safety brake device.

5. The safety brake device of claim 1, wherein the first and second friction pads are made of a material that is at least partially saturated with a lubricant.

6. The safety brake device of claim 1 wherein the first and second friction pads are made of a material having a ratio of static coefficient of friction to dynamic coefficient of friction from 1.05 to 1.15.

7. The safety brake device of claim 1 in combination with the shaft attached to a motorized drive and at least one winch drum, wherein said safety brake device and said at least one winch drum is mounted on said shaft and said at least one winch drum carries a cable secured to the load.

* * * * *

UNITED STATES PATENT AND TRADEMARK OFFICE

CERTIFICATE OF CORRECTION

PATENT NO. : 9,162,791 B2
APPLICATION NO. : 13/845696
DATED : October 20, 2015
INVENTOR(S) : Robert Z. Gartrell, III It is certified that error appears in the above-identified patent and that said Letters Patent is hereby corrected as shown below:

Title Page:
Item 72 the address of the Inventor, change “Mt. Pleasant” to -- Charleston --

Signed and Sealed this
Twenty-first Day of June, 2016

Michelle K. Lee
*Director of the United States Patent and Trademark Office*